Patented July 23, 1946

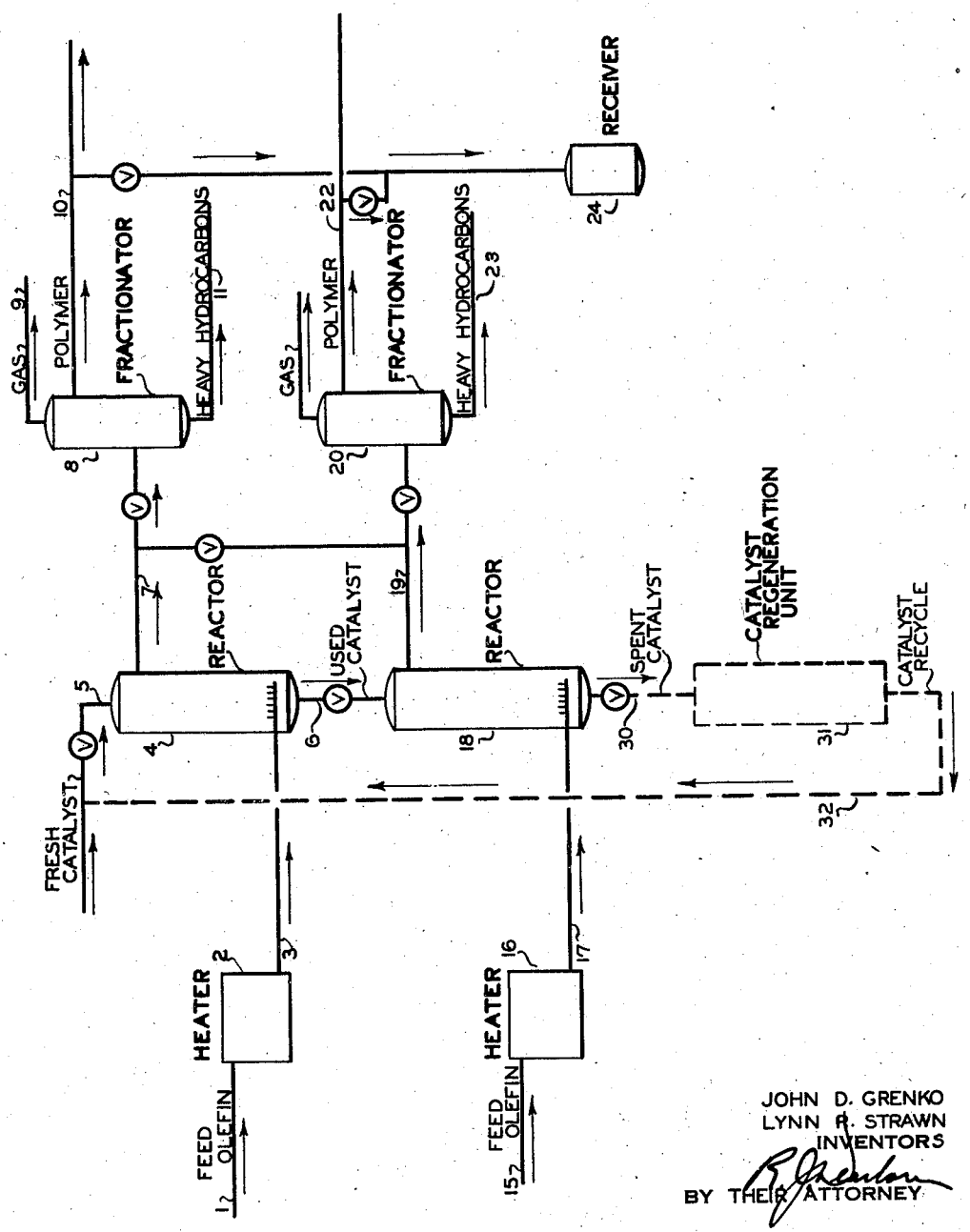

2,404,628

UNITED STATES PATENT OFFICE 2,404,628

POLYMERIZATION OF HYDROCARBONS

John D. Grenko and Lynn R. Strawn, Port Arthur, Tex., assignors to The Texas Company, New York, N. Y., a corporation of Delaware Application June 18, 1943, Serial No. 491,320

4 Claims. (Cl. 260—666)

This invention relates to the polymerization of hydrocarbons such as normally gaseous olefins to produce naphtha hydrocarbons useful in the manufacture of motor fuel.

The invention involves polymerizing normally gaseous olefins such as propylene and butylene by contact with a solid polymerizing catalyst of the alumina-silica gel type and more particularly with a catalyst consisting essentially of a mixture of silica, alumina and zirconia such as described in U. S. Patent No. 2,249,583. More specifically the invention involves effecting the polymerization with this type of catalyst under conditions such that a polymer naphtha relatively rich in aromatic constituents is obtained.

In accordance with the invention the feed olefin is subjected to contact with an alumina-silica type catalyst at a temperature within the range about 580 to 700° F. and under a pressure of about 150 pounds per square inch gauge or under a pressure in the range atmospheric to 300 pounds per square inch gauge. It has been found that by effecting the polymerization reaction with this type of catalyst within the temperature range in question the resulting polymer is unexpectedly rich in aromatic constituents.

The above mentioned patent broadly discloses subjecting olefins to contact with a catalyst of the type in question at temperatures ranging from 200 to 650° F. and under pressures ranging from 400 to 4000 pounds per square inch gauge.

Polymerization of olefins such as propylene with naturally occurring and synthetic aluminum silicates has also been described by Frederick H. Gayer in an article entitled "The catalytic polymerization of propylene," published in Industrial and Engineering Chemistry, October, 1933, pages 1122 to 1127. According to this author activated Floridin and especially a synthetic alumina-on-silica catalyst are active in the polymerization of propylene to a liquid hydrocarbon mixture of very high unsaturation. Elsewhere the author points out that the polymer so obtained is predominantly composed of olefin hydrocarbons.

The present invention has to do, however, with the discovery that by employing a reaction temperature about 580 to 600° F. and above, the resulting polymer naphtha may contain as much as 40 to 50% or more by weight of aromatic hydrocarbons.

The production of naphtha rich in aromatic constituents is advantageous from the standpoint of manufacturing aviation motor fuel useful where a high supercharging rate is employed so as to obtain a large power output without detonation such as is necessary during take-off. In other words, during take-off it is desirable to employ a rich mixture and for this purpose a naphtha having a high content of aromatic constituents is preferable to one having a high content of paraffinic constituents, the latter being useful where a lean mixture is employed as in cruising operations.

A modification of the present invention involves subjecting feed olefins to contact with a fresh or freshly regenerated silica-alumina gel polymerization catalyst at a moderate temperature not in excess of about 560° F. under which conditions the resulting polymer naphtha has a relatively high content of saturated hydrocarbons. The used catalyst preferably after being in contact with olefin feed hydrocarbons for not more than about 5 hours under the aforesaid moderate temperature conditions is then employed in a separate operation to effect polymerization of feed olefins under more elevated temperature conditions so as to obtain a polymer naphtha which is relatively rich in aromatic constituents. The naphtha products obtained from each operation may be separately disposed of or may be blended all or in part for the purpose of producing motor fuel of predetermined characteristics.

Co-pending application, Serial No. 493,186, for Polymerization of hydrocarbons, filed on July 2, 1943, by Nelson B. Haskell and Charles J. Randolph, Jr., describes more specifically the polymerization of normally gaseous olefins under moderate temperature conditions with an alumina-silica gel type of catalyst so as to obtain polymer gasoline characterized by having a relatively high content of unsaturated hydrocarbons. The co-pending application discloses effecting the reaction at a temperature in the range about 425 to 560° F. during passage of the feed hydrocarbons in gas phase through a contact mass of the catalyst employing a mass velocity in the range about 0.25 to 0.55 pound of hydrocarbon feed per pound of catalyst per hour. As there disclosed the catalyst remains in contact with the hydrocarbons undergoing treatment for not longer than about 5 hours between catalyst regenerations.

The present invention involves a distinction since it has to do with employment of a reaction temperature substantially above 560° F. for the purpose of producing polymer naphtha of different character, namely, rich in aromatic constituents. However, it is within the scope of this invention to employ a two-stage operation, the first stage involving the aforementioned moderate temperature reaction while the second stage involves the higher temperature reaction using partially spent catalyst from the moderate temperature stage. In the higher temperature stage the used catalyst may be maintained onstream for a substantial period of time of about five to eight hours or ranging from a few hours up to two or three days, thereafter the catalyst is regenerated in the conventional manner and re-employed in the moderate temperature reaction.

In practicing the process of this invention a catalyst may be maintained in a fixed bed, or beds, within a reaction zone or zones. In such case the feed olefin heated to the desired temperature is continuously passed through the contact mass maintained at the reaction temperature, and the flow of hydrocarbons continued therethrough until the catalyst has become spent. Thereupon the catalyst may be regenerated in situ by the passage therethrough of oxygen-bearing gas so as to remove carbonaceous deposits upon the catalyst by combustion. Advantageously a plurality of reaction zones are employed particularly where the aforementioned two-stage operation is employed. In this way when the catalyst in the low temperature stage has been onstream for 5 hours the feed stream may then be diverted to an adjoining reactor containing fresh or freshly regenerated catalyst. During this period the offstream contact mass is employed for the higher temperature reaction until such time as it has become substantially spent, when the feed stream is then diverted to another contact mass which may be partially spent in the low temperature reaction. The completely spent catalyst is then regenerated and thus placed in condition for employment in the low temperature reaction. The several reaction zones are thus manifolded together by suitable pipe connections so that any one or more of the reactors may be taken offstream either for use under different temperature conditions or for regeneration of the catalyst.

Instead of a fixed bed type of operation a movable bed type of operation may be employed wherein a body of catalyst moves gradually through the reaction zone either counter-currently to or concurrently with a stream of feed hydrocarbons undergoing treatment. For example, two reaction zones may be employed, the first being used for the low temperature reaction, while the second is used for the higher temperature reaction. A body of catalyst moves through the low temperature reaction zone and the catalyst issuing therefrom is conducted to the higher temperature zone. The spent catalyst issuing from this higher temperature zone is then subjected to regeneration after which it is returned for use in the low temperature reaction zone.

The latter type of operation is illustrated by means of a flow diagram shown in the accompanying drawing to which reference will now be made for the purpose of further description of the invention.

As indicated in the drawing a stream of feed olefin such as propylene is conducted from a source not shown through a pipe 1 to a heater 2 wherein it is raised to a temperature in the range 425 to 560° F. and under a pressure of about 150 pounds. The heated hydrocarbon vapor is then conducted through a pipe 3 to the lower portion of a vertical reactor 4 containing a mass of silica-alumina gel catalyst in the form of small granules, particles, pellets or pills, etc.

The catalyst is continually fed into the upper portion of the reactor 4 through a conduit 5. Provision may be made within the reactor 4 for maintaining the catalyst in the form of one or more beds of desired depth. The catalyst moves slowly and downwardly through the reactor from the bottom of which it is removed through a conduit 6.

Thus, as indicated, the feed hydrocarbon in this instance flows countercurrently to the downwardly moving body of catalyst. The polymerized hydrocarbons including unreacted hydrocarbons are continuously drawn off from the upper portion of the reactor 4 through a pipe 7 leading to a fractionator or fractionating unit 8.

Fractionation may be carried out so as to separate the product into a plurality of fractions including a gas fraction removed through a pipe 9, a polymer naphtha fraction through a pipe 10 and a heavy hydrocarbon fraction through a pipe 11. The gas fraction will comprise unreacted olefin hydrocarbons which may be recycled all or in part to the heater 2 or to the reactor 4.

A separate stream of feed olefin which may be of the same character as that previously mentioned is conducted from a source not shown through a pipe 15 to a heater 16 wherein it is heated to a temperature in the range 560 to 700° F. The resulting heated hydrocarbons under a pressure of about 150 pounds are passed through a pipe 17 to the lower portion of a reactor 18 operating on the same principle as the previously mentioned reactor 4.

The used catalyst passing through the pipe 6 to which reference has already been made passes into the upper portion of the reactor 18 and provides the moving bed or beds of catalyst contained within the reactor 18.

The feed hydrocarbons likewise rise countercurrently through the downwardly moving catalyst maintained at the reaction temperature.

The polymerized and unreacted hydrocarbons are continuously drawn off through a pipe 19 to a fractionator or fractionating unit 20. This fractionator also may be operated to separate the previously described three fractions.

The polymer naphtha issuing from the fractionator 8 will be poor in aromatics or substantially free from aromatics, but relatively rich in saturated hydrocarbons, whereas the polymer naphtha issuing from the fractionator 20 will be relatively rich in aromatic constituents and may be substantially free from saturated hydrocarbon constituents. A gas fraction may be removed from the fractionator 20 through a pipe 21 and the olefinic constituents thereof recycled all or in part to the polymerization reaction. The polymer naphtha may be drawn off through a pipe 22 while the heavier hydrocarbons are removed through a pipe 23.

If desired the polymer naphtha products obtained from the two fractionating units may be drawn off all or in part to a receiver 24 for the purpose of blending to produce motor fuel of predetermined characteristics.

Spent catalyst is drawn off continuously from the bottom of the reactor 18 through a conduit 30 and may be passed to a catalyst regeneration unit 31 from which it can be recycled through a conduit 32 to the reactor 4.

In the reactor 18 the charging rate may be maintained so that the mass velocity is within the range about .20 to 1.0 pound of hydrocarbon feed per pound of catalyst per hour.

While a moving bed catalytic operation is described in connection with the drawing, nevertheless it is also contemplated that other means of employing the catalyst may be utilized, as, for example, a catalyst in powdered form may be injected into a body of the vaporized hydrocarbons undergoing treatment within the reaction zone.

The catalyst may be used in the presence of a small amount of moisture. For example, it may amount to from a fraction of a per cent to several per cent by weight of the feed.

In a fixed bed type of operation it may be advantageous to condition the catalyst following regeneration and this may be accomplished by passing a stream of feed olefin through the contact mass or bed at a temperature substantially below the reaction temperature for a period of about 40 to 60 minutes. For example, the catalyst employed in the low temperature reaction may be conditioned by passing feed olefins at a temperature in the range 75 to 300° F. through the contact mass for a period of about 1 hour.

In the following examples propylene was subjected to polymerization by the action of the catalyst of the character described in U. S. Patent No. 2,249,583. Such a catalyst consists essentially of a calcined mixture of a major proportion of precipitated silica and minor proportions of alumina and zirconia having approximately the following composition: $100SiO_2$, $2Al_2O_3$ and $12ZrO_2$.

The reaction was carried out by continuously passing a stream of the propylene in gas phase through a contact mass of the catalyst maintained at a predetermined reaction temperature.

*Example A*

| Temp., °F. | Time, hrs. | MV | Yield | Olefins | Aromatics | Saturates |
|---|---|---|---|---|---|---|
| 415 | 0.5 | 0.549 | 31.4 | 22 | 7 | 71 |
| 580 | 3.5 | .526 | 37.3 | 35 | 37 | 28 |
| 580 | 6.0 | .530 | 41.4 | 32 | 28 | 40 |

In the foregoing tabulation the temperature represents the average reaction temperature of the contact mass; time refers to the length of time in hours that the contact mass has been onstream; MV represents the mass velocity in pounds of charge per pound of catalyst per hour; yield represents the weight per cent of the polymer product, basis propylene feed; and olefins, aromatics and saturates represent the per cent by weight of these constituents in the polymer product.

As indicated by the tabulated data the product obtained at a reaction temperature of 415° F. has a relatively low aromatic content, namely, 7%, and a relatively high saturated hydrocarbon content, namely, 71%. By effecting the reaction at a temperature of 580° F., however, the aromatic content is materially increased to a value ranging from 28 to 37%.

*Example B*

| Temp., °F. | Time, hrs. | MV | Yield | Olefins | Aromatics | Saturates |
|---|---|---|---|---|---|---|
| 340 | ½ | .505 | 39.2 | 47 | 0 | 53 |
| 423 | 1 | .841 | 43.8 | 51 | 0 | 49 |
| 652 | 3 | .313 | 70.1 | 46 | 53 | 1 |

This example likewise indicates that temperatures of 423° F. and below are productive of polymer naphtha products free or substantially free from aromatic constituents although such products have a relatively high content of saturated hydrocarbons. By increasing the temperature to 652° F., however, the aromatic content of the polymer product is increased to 53%.

The polymer gasoline rich in aromatic constituents which is obtained by employing a reaction temperature ranging from about 560 to 700° F. is characterized by having a CFRM octane number of about 78 to 80. The addition of 3 ccs. of TEL raises the octane number to about 87.

Mention has been made of treating propylene, but it will be understood that the feed to the process may comprise a mixture of olefin and non-olefin hydrocarbons such as obtained from refinery sources.

Obviously many modifications and variations of the invention, as hereinbefore set forth may be made without departing from the spirit and scope thereof, and therefore only such limitations should be imposed as are indicated in the appended claims.

We claim:

1. A process for polymerizing propylene which comprises passing propylene through a mass of polymerization catalyst consisting essentially of a calcined mixture of precipitated silica, alumina and zirconia having approximately the composition $100SiO_2: 2Al_2O_3: 12ZrO_2$, said catalyst having been previously exposed for a short time to feed olefin under polymerizing conditions at a temperature of at least about 340° F. and not in excess of about 560° F. maintaining a velocity of flow through the contact mass such that the mass velocity through the catalyst is in the range about .2 to .3 and effecting contact between propylene vapor and catalyst at a temperature of about 580 to 650° F., under a pressure of about 150 to 300 pounds thereby obtaining a polymer naphtha containing 40 to 50% and more by weight of aromatic hydrocarbons.

2. A process for polymerizing propylene to produce naphtha rich in aromatics which comprises passing propylene in a continuous stream through a mass of polymerization catalyst consisting essentially of a calcined mixture of precipitated silica, alumina and zirconia having the approximate composition $100SiO_2: 2Al_2O_3: 12ZrO_2$, said catalyst having been previously subjected to contact for a short time with a stream of propylene gas under polymerizing conditions at a temperature below about 560° F., maintaining the catalyst mass at a temperature of about 580 to 650° F., and under a pressure of about 150 to 300 pounds and maintaining a velocity of flow through the contact mass such that the mass velocity through the catalyst is in the range about 0.2 to 1.0 pound of hydrocarbon feed per pound of catalyst per hour.

3. A continuous process for polymerizing propylene which comprises passing a stream of hot propylene vapor through a reaction zone maintained at about 425 to 560° F., subjecting said vapor to contact therein with a catalyst consisting essentially of a calcined mixture of precipitated silica, alumina and zirconia having the approximate composition $100SiO_2: 2Al_2O_3: 12ZrO_2$, removing from the reaction zone an effluent hydrocarbon stream comprising polymer naphtha rich in saturated hydrocarbons, removing used catalyst from said reaction zone, passing removed catalyst to a separate reaction zone, passing through said separate reaction zone a separate stream of hot propylene vapor, effecting contact between used catalyst and said separate stream of propylene vapor at a temperature of about 580 to 650° F., removing from said separate reaction zone an effluent hydrocarbon stream comprising polymer naphtha rich in aromatics, and blending polymer naphtha from both said reaction zones to form motor fuel.

4. The method according to claim 3 in which used catalyst is removed from said separate zone, regenerated, and returned to said first-mentioned reaction zone.

JOHN D. GRENKO.
LYNN R. STRAWN.